(12) United States Patent
Chu

(10) Patent No.: US 12,526,497 B2
(45) Date of Patent: Jan. 13, 2026

(54) IMAGING DEVICE AND MOBILE DEVICE

(71) Applicant: HON HAI PRECISION INDUSTRY CO., LTD., New Taipei (TW)

(72) Inventor: Chia-Chin Chu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 113 days.

(21) Appl. No.: 18/733,661

(22) Filed: Jun. 4, 2024

(65) Prior Publication Data

US 2025/0294229 A1    Sep. 18, 2025

(30) Foreign Application Priority Data

Mar. 13, 2024  (CN) .......................... 202410285452.2

(51) Int. Cl.
*H04N 23/51*  (2023.01)
*H04N 23/52*  (2023.01)

(52) U.S. Cl.
CPC ............. *H04N 23/51* (2023.01); *H04N 23/52* (2023.01)

(58) Field of Classification Search
CPC ............................... H04N 23/51; H04N 23/52
See application file for complete search history.

(56) References Cited

U.S. PATENT DOCUMENTS

| 12,335,635 | B1* | 6/2025 | Barr | H04N 23/52 |
| 2014/0055671 | A1* | 2/2014 | Kawamura | H04N 5/64 |
| | | | | 348/374 |
| 2016/0301819 | A1* | 10/2016 | Petty | G03B 17/55 |
| 2017/0064266 | A1* | 3/2017 | Nakatsu | H04N 9/3144 |
| 2021/0160405 | A1* | 5/2021 | Yano | H04N 23/51 |
| 2023/0379560 | A1* | 11/2023 | Regalbuto | G01S 7/4813 |

FOREIGN PATENT DOCUMENTS

CN    116170676 A    5/2023

\* cited by examiner

*Primary Examiner* — Amy R Hsu
(74) *Attorney, Agent, or Firm* — ScienBiziP, P.C.

(57) ABSTRACT

An imaging device includes a lens and a plurality of air ducts. The lens includes a lens element having an optical axis extending along a first direction. Each air duct includes an inlet duct and an outlet duct. The inlet duct can introduce air. When viewed along the first direction, the outlet ducts are disposed around the lens element, each outlet duct extend towards the optical axis in a direction perpendicular to the first direction; each outlet duct includes an air outlet, and the air outlet can exhaust the air to form an air wall. Along an extending direction of each outlet duct, a projection of the air outlet onto the optical axis forms an axial segment, and the air wall from the air outlet passes through the axial segment, axial segments of the outlet ducts are spaced from each other. The present disclosure further provides a mobile device.

18 Claims, 9 Drawing Sheets

IMAGING DEVICE AND MOBILE DEVICE

FIELD

The subject matter herein generally relates to imaging, and more particularly, to an imaging device and a mobile device.

BACKGROUND

Imaging devices are important components of mobile devices such as cars and drones. When the mobile device moves, a lens of the imaging device may be contaminated by stains due to poor anti-contamination performance, thereby affecting the normal use of the lens. Therefore, there is a room for improvement in the art.

BRIEF DESCRIPTION OF THE DRAWINGS

Implementations of the present technology will now be described, by way of example only, with reference to the attached figures.

DETAILED DESCRIPTION

Figure 1:
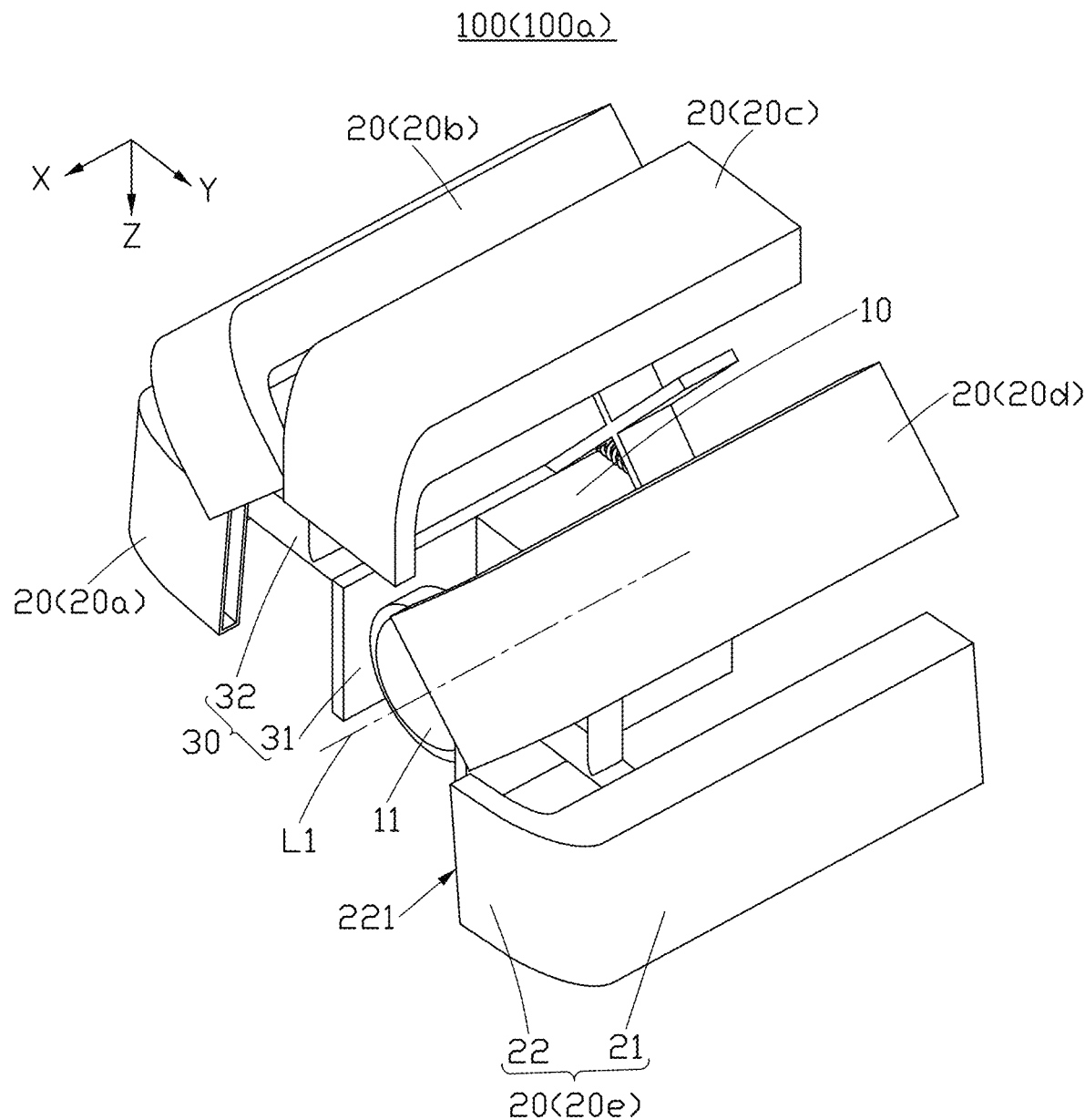
FIG. 1 is a diagrammatic view of an embodiment of an imaging device from a first perspective according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Some embodiments of the present disclosure will be described in detail with reference to the drawings. If no conflict, the following embodiments and features in the embodiments can be combined with each other.

The term "vertical" can describe an ideal state between two components. In the actual production or use state, there can be a state that is approximately perpendicular between the two components. For example, two planes described as being "vertical" to each other may mean that the two planes may form an angle of 90°±10°.

Referring to FIG. 1, an imaging device 100 is provided according to an embodiment of the present disclosure. The imaging device 100 includes a lens 10 and a plurality of air ducts 20. The lens 10 can collect lights reflected by an object to be imaged. The lens 10 includes a lens element 11. The lens element 11 has an optical axis L1 extending along a first direction X.

Each air duct 20 includes an inlet duct 21 and an outlet duct 22 connecting to the inlet duct 21. The inlet duct 21 can introduce air, and the outlet duct 22 can exhaust the air from the inlet duct 21. An air inlet 211 of the inlet duct 21 connects to an external air pump (not shown), and air can be introduced into the inlet duct 21 through the air inlet 211 under the function of the air pump. In another embodiment, during a movement of the imaging device 100, the air inlet 211 is aligned with a direction of movement of the imaging device 100, so that air can be introduced into the inlet duct 21 through the air inlet 211.

When viewed along the first direction X, a plurality of outlet ducts 22 are disposed around the lens element 11, and each outlet duct 22 extends towards the optical axis L1 in a direction perpendicular to the first direction X. In some embodiments, when viewed along the first direction X, the lens element 11 is substantially circular, and the outlet ducts 22 are disposed radially around the lens element 11.

Figure 2:
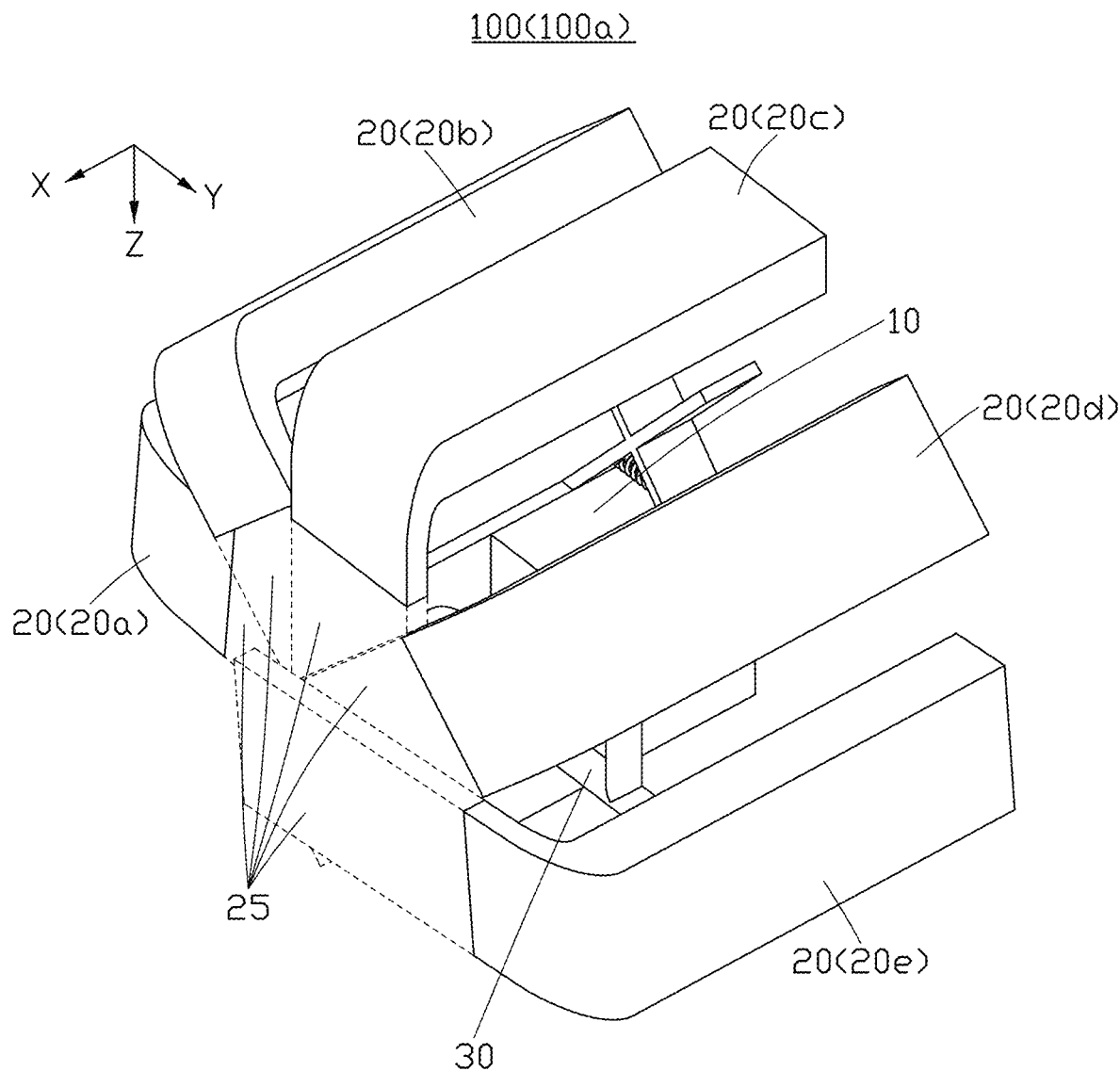
FIG. 2 is diagrammatic view of air walls formed by the imaging device from the first perspective of FIG. 1.

Referring to FIGS. 1 and 2, each outlet duct 22 includes an air outlet 221 away from the inlet duct 21. The air exhausted from each air outlet 221 forms an air wall 25 at an object side of the lens element 11. A plurality of air walls 25 can change a trajectory of stains moving towards the lens element 11, causing the stains to move away from the lens element 11, thereby reducing a risk of the lens element 11 being contaminated by stains and an anti-contamination performance of the imaging device 100.

The stains can include, but are not limited to, dust, rainwater, and sediment in the air.

Figure 3:
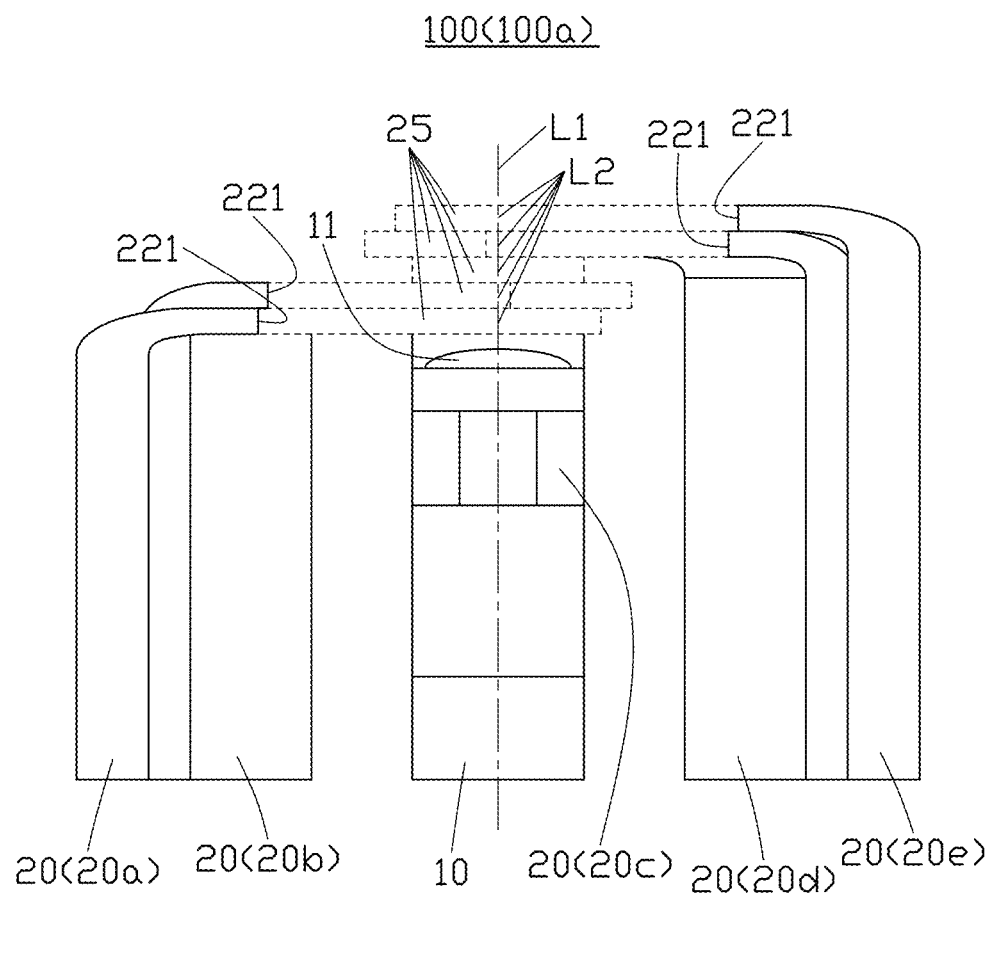
FIG. 3 is diagrammatic view of air walls formed by the imaging device from a second perspective of FIG. 1.

Referring to FIGS. 2 and 3, along an extending direction of the outlet duct 22, a projection of each air outlet 221 onto the optical axis L1 forms an axial segment L2, and the air wall 25 from the air outlet 221 passes through the axial segment L2. A plurality of axial segments L2 formed by the air outlets 221 on the optical axis L1 are spaced from each other, so that the air walls 25 are disposed along the first direction X on the object side of the lens element 11, reducing the risk of interference between the air walls 25 formed by the different air outlets 221, thereby increasing the intensity of the air walls 25, and enhancing the anti-contamination performance of the imaging device 100.

In some embodiments, the axial segments L2 formed by the air outlets 221 on the optical axis L1 are disposed in sequence. In other embodiments, the axial segments L2 formed by the air outlets 221 on the optical axis L1 are spaced apart from each other.

Figure 4:
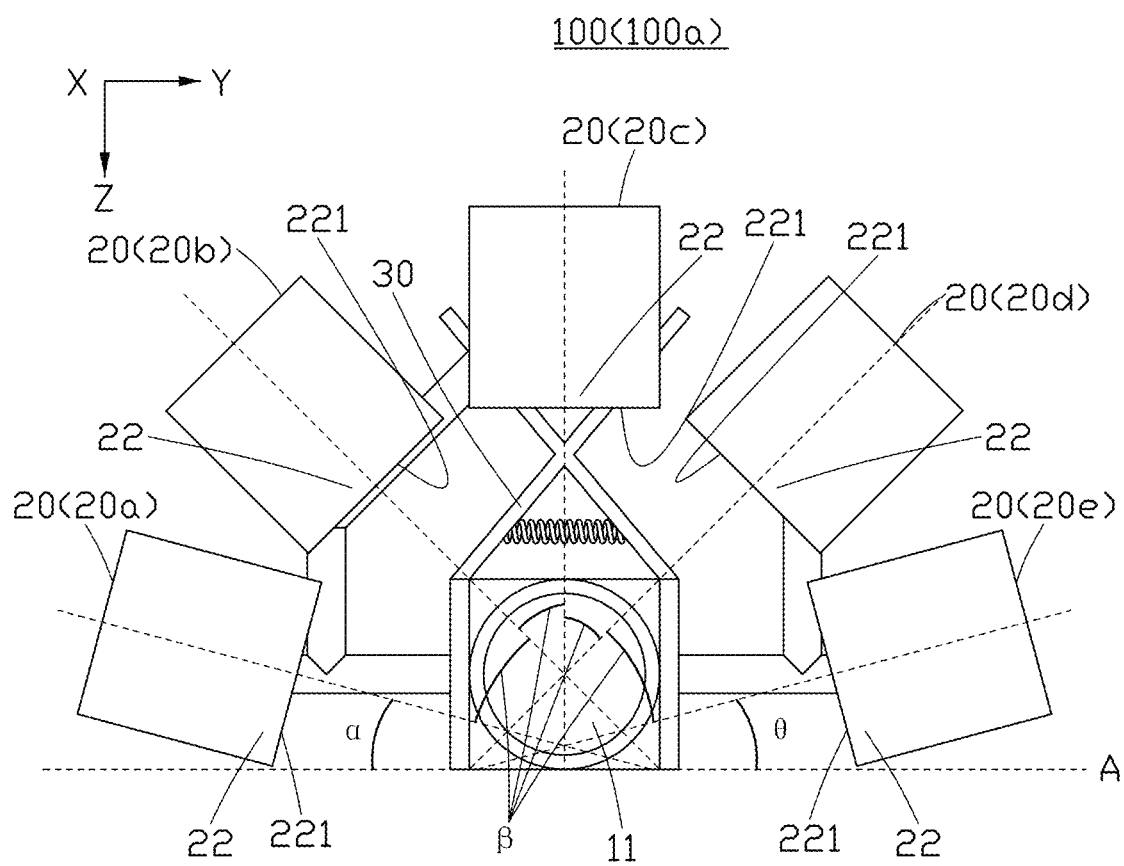
FIG. 4 is a diagrammatic view of an embodiment of an imaging device from a second perspective according to the present disclosure.

Referring to FIG. 4, in some embodiments, along the first direction X, a projection of each outlet duct 22 is spaced from a projection of the lens element 11, minimizing a risk of the outlet ducts 22 obstructing the lens element 11.

In some embodiments, when viewed along the first direction X, a horizontal plane A is defined as being perpendicular to a direction of gravity Z and also tangent to a lower side of the lens element 11 in the direction of gravity Z. The outlet ducts 22 are disposed on the side of the lens element 11 where the horizontal plane A is tangent to the lens element 11. The first direction X is perpendicular to the direction of gravity Z. Along the direction of gravity Z, the end of each outlet duct 22 opposite to the air outlet 221 is higher than or flush with the air outlet 221, to reduce a risk of stains accumulating in the outlet ducts 22 under the influence of gravity, thereby increasing the intensity of the air walls 25 and enhancing the anti-contamination performance of the imaging device 100.

In other embodiments, the outlet ducts 22 are disposed around the lens element 11.

Referring to FIG. 4, in some embodiments, when viewed along the first direction X, each outlet duct 22 is inclined with or perpendicular to the horizontal plane A in the extending direction of the outlet duct 22, which facilitates the expulsion of stains from the air outlet 221 under the action of gravity, further to reduce a risk of stains accumulating in the outlet ducts 22 under the influence of gravity, thereby increasing the intensity of the air walls 25 and enhancing the anti-contamination performance of the imaging device 100.

In other embodiments, when viewed along the first direction X, an angle β is defined between the extending directions of two adjacent outlet ducts 22, and the two angles β are equal to each other, so that the air walls 25 can cover the area around the lens element 11, thereby further improving the anti-contamination performance of the imaging device 100.

Figure 5:
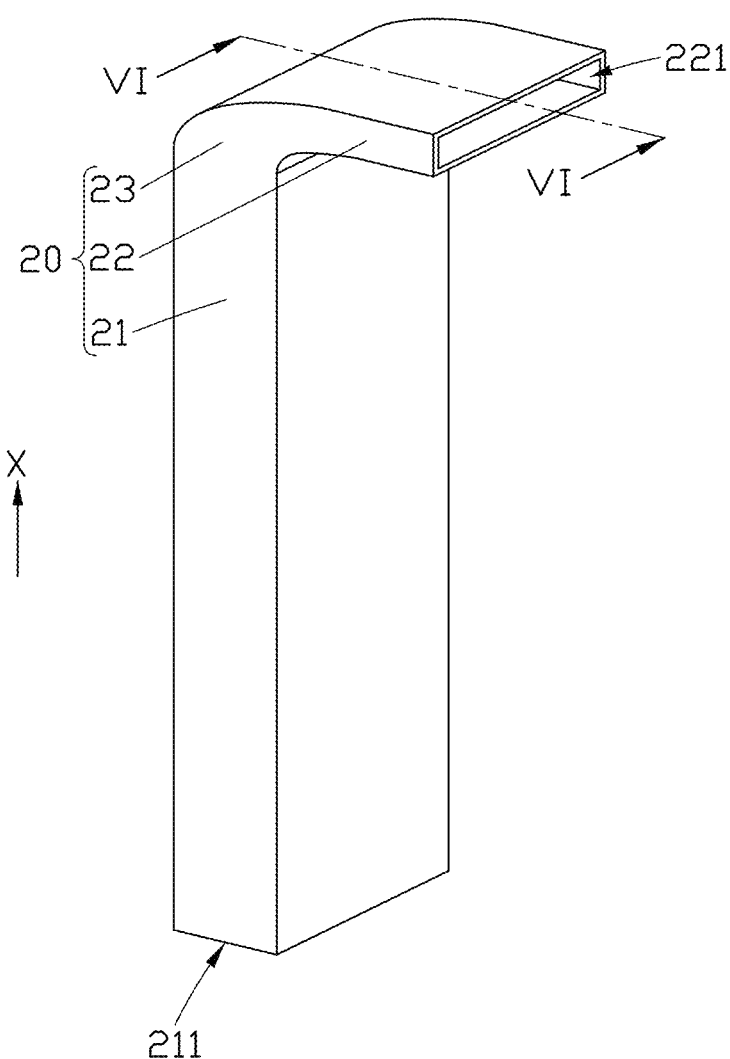
FIG. 5 is a diagrammatic view of an air duct of the imaging device of FIG. 1.

Referring to FIGS. 1 and 5, in some embodiments, each inlet duct 21 extends along the first direction X and disposed around the lens 10, to enhance a spatial utilization between the air ducts 20 and the lens 10.

In other embodiments, the air inlet 211 is provided at an end of each inlet duct 21 away from the outlet duct 22. The inlet duct 21 is bent to align the air inlet 211 with the direction of movement of the imaging device 100, so as to guide the air into the inlet duct 21.

In some embodiments, an area of the air inlet 211 is larger than an area of the air outlet 221. An amount of air introducing into the air inlet 211 is equal to an amount of air exhausting out the air outlet 221. Since the air passes through the air duct 20 can be accelerated, enhancing the air pressure at the air outlet 221, thereby enhancing an intensity of the air walls 25.

In some embodiments, when viewed along a direction perpendicular to the first direction X, the air outlet 221 is substantially rectangular. A length of the rectangular is greater than or equal to a diameter of the lens element 11, allowing that the air wall 25 covers the lens element 11.

Figure 6:
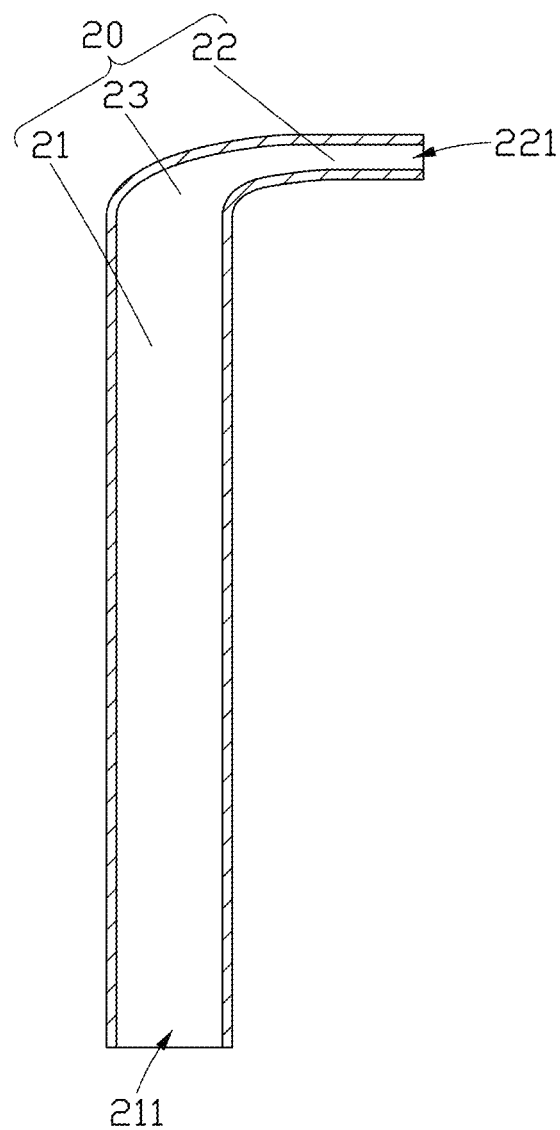
FIG. 6 is a cross-sectional view taken along line VI-VI of FIG. 5.

Referring to FIGS. 5 and 6, in some embodiments, each air duct 20 further includes a transiting duct 23. The transiting duct 23 connects to the inlet duct 21 and the outlet duct 22. The transiting duct 23 is substantially arcuate to minimize a loss of intensity of the air walls 25 caused by a redirection of air within the air duct 20.

Figure 7:
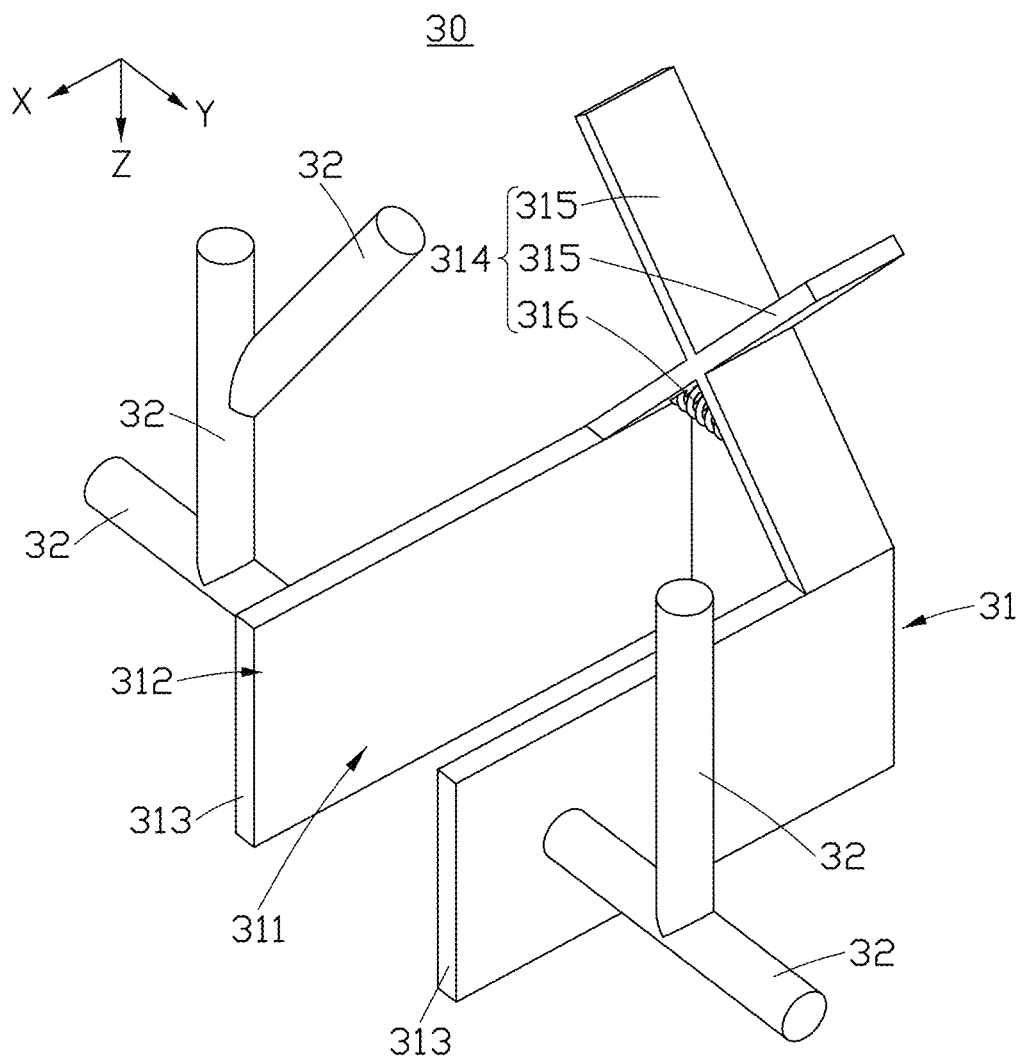
FIG. 7 is diagrammatic view of a supporting base of the imaging device of FIG. 1.

Referring to FIGS. 1 and 7, in some embodiments, the imaging device 100 further includes a supporting base 30. The supporting base 30 includes an installing portion 31 and a plurality of connecting rods 32. A cavity 311 and a first opening 312 are defined on the installing portion 31. The cavity 311 and the first opening 312 are communicated with each other. The lens 10 is disposed within the cavity 311. The lens element 11 is exposed from the first opening 312. One end of each connecting rod 32 connects to the installing portion 31 or connects to another connecting rod 32, and another end of each connecting rod 32 connects to the inlet duct 21, to enhance a stability between the lens 10 and the air ducts 20.

In some embodiments, the installing portion 31 includes two installing plates 313 and a connecting member 314 disposed between the two installing plates 313. The installing plates 313 are spaced apart from each other along the second direction Y. A cavity 311 is formed between the installing plates 313. The lens 10 is clamped between the installing plates 313, and one end of the installing plates 313 forms the first opening 312. The first direction X, the direction of gravity Z, and the second direction Y are perpendicular to each other.

In some embodiments, the connecting member 314 includes two connecting plates 315 and an elastic element 316. Each connecting plate 315 connects to an installing plate 313, and the elastic element 316 is disposed between the two connecting plates 315. The connecting plates 315 elastically clamp the lens 10 through the two installing plates 313, to enhance a stability between the lens 10 and the supporting base 30.

Embodiment 1

Referring to FIGS. 1 and 7, an imaging device 100a is provided according to an embodiment of the present disclosure. The imaging device 100a includes five air ducts 20. The five air outlets 22 of the five air ducts 20 are disposed on a side where the horizontal plane A is tangent to the lens element 11. The five air ducts 20 are defined as a first air duct 20a, a second air duct 20b, a third air duct 20c, a fourth air duct 20d, and a fifth air duct 20e, respectively. The axis segments L2 formed by the air outlets 22 of the first air duct 20a, the second air duct 20b, the third air duct 20c, the fourth air duct 20d, and the fifth air duct 20e on the optical axis L1 are sequentially away from the lens element 11 along the first direction X.

When viewed along the first direction X, the air outlet 22 of the first air duct 20a and the air outlet 22 of the fifth air duct 20e are adjacent to the horizontal plane A, respectively. The air outlet 22 of the second air duct 20b, the air outlet 22 of the third air duct 20c, and the air outlet 22 of the fourth air duct 20d are sequentially disposed between the air outlet 22 of the first air duct 20a and the air outlet 22 of the fifth air duct 20e.

Referring to FIG. 4, an angle between the extending direction of the air outlet 22 of the first air duct 20a and the horizontal plane A is α, so that the end of the air outlet 22 of the first air duct 20a away from the air outlet 221 is higher than the air outlet 221. An angle between the extending direction of the air outlet 22 of the fifth air duct 20e and the horizontal plane A is θ, so that the end of the air outlet 22 of the fifth air duct 20e away from the air outlet 221 is higher than the air outlet 221. When viewed along the first direction X, the angle β is defined between two extending directions of two adjacent air outlet ducts 22, any two angles β are equal, and each angle β is equal to $(180 \text{ degrees} - \alpha - \theta) * 25\%$.

In some embodiments, α is one of 5 degrees, 10 degrees, 15 degrees, 20 degrees, 15 degrees, or 30 degrees. θ is one of 5 degrees, 10 degrees, 15 degrees, 20 degrees, 15 degrees, or 30 degrees. In the embodiment, α is equal to θ.

Embodiment 2

Figure 8:
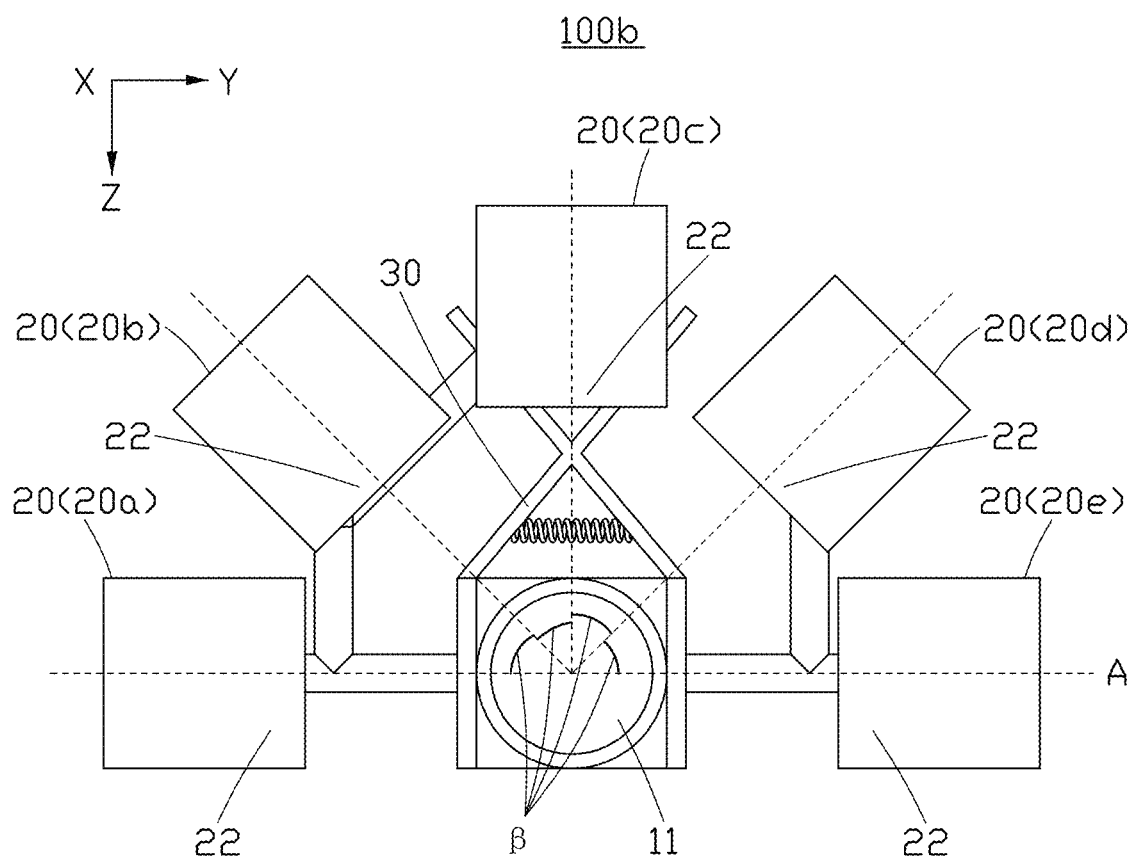
FIG. 8 is a diagrammatic view of another embodiment of an imaging device according to the present disclosure.
Figure 9:
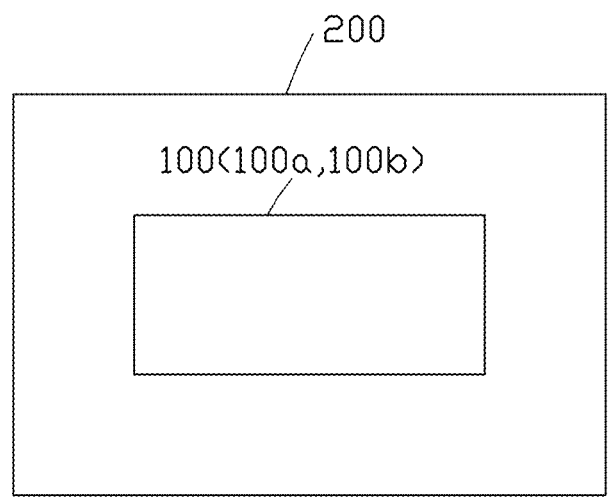
FIG. 9 is a diagrammatic view of an embodiment of a mobile device according to the present disclosure.

Referring to FIG. 8, an imaging device 100b is provided according to an embodiment of the present disclosure. A difference between the imaging device 100b and the imaging device 100a is that the extending direction of the air outlet 22 of the first air duct 20a is parallel to the horizontal plane A, so that the end of the air outlet 22 of the first air duct 20a far away from the air outlet 221 is flush with the air outlet 221. The extending direction of the air outlet 22 of the fifth air duct 20e is also parallel to the horizontal plane A, so that the end of the air outlet 22 of the fifth air duct 20e far away from the air outlet 221 is flush with the air outlet 221. When viewed along the first direction X, the air outlet 22 of the first air duct 20a and the air outlet 22 of the fifth air duct 20e are oppositely disposed along the second direction Y. Each angle β is 45 degrees.

Referring to FIG. 8, a mobile device 200 is provided according to an embodiment of the present disclosure. The mobile device 200 includes any one of the imaging devices 100 (100a or 100b) described in the above embodiments. The mobile device 200 can be, but is not limited to, a car, a drone, a ship, etc.

In the imaging device 100 includes the lens 10 and the air ducts 20, when viewed along the first direction X, the plurality of outlet ducts 22 are disposed around the lens element 11, and each outlet duct 22 extends towards the optical axis L1 in the direction perpendicular to the first direction X. Each outlet duct 22 includes the air outlet 221 away from the inlet duct 21. The air exhausted from each air outlet 221 forms the air wall 25 at the object side of the lens element 11. The plurality of air walls 25 can change the trajectory of stains moving towards the lens element 11, causing the stains to move away from the lens element 11, thereby reducing the risk of the lens element 11 being contaminated by stains and the anti-contamination performance of the imaging device 100. Along the extending direction of the outlet duct 22, the projection of each air outlet 221 onto the optical axis L1 forms the axial segment L2, and the air wall 25 from the air outlet 221 passes through the axial segment L2. The plurality of axial segments L2 formed by the air outlets 221 on the optical axis L1 are spaced from each other, so that the air walls 25 are disposed along the first direction X on the object side of the lens element 11, reducing the risk of interference between the air walls 25 formed by the different air outlets 221, thereby increasing the intensity of the air walls 25, and enhancing the anti-contamination performance of the imaging device 100.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. An imaging device comprising:
   a lens comprising a lens element, the lens element having an optical axis extending along a first direction;
   a plurality of air ducts, each of the plurality of air ducts comprising an inlet duct and an outlet duct connecting to the inlet duct, the inlet duct configured to introduce air;
   wherein when viewed along the first direction, a plurality of the outlet duct are disposed around the lens element, each of the plurality of outlet ducts extends towards the optical axis in a direction perpendicular to the first direction; each of the plurality of outlet ducts comprises an air outlet away from the inlet duct, and the air outlet is configured to exhaust air from the inlet duct to form an air wall; along an extending direction of each of the plurality of outlet ducts, a projection of the air outlet onto the optical axis forms an axial segment, and the air wall from the air outlet passes through the axial segment, axial segments of the plurality of outlet ducts are spaced from each other.

2. The imaging device of claim 1, wherein along the first direction, a projection of each of the plurality of outlet ducts is spaced from a projection of the lens element.

3. The imaging device of claim 1, wherein when viewed along the first direction, a horizontal plane is defined, the horizontal plane is perpendicular to a direction of gravity and tangent to a lower side of the lens element in the direction of gravity, the plurality of outlet ducts is disposed on a side of the lens element where the horizontal plane is tangent to the lens element, and the first direction is perpendicular to the direction of gravity.

4. The imaging device of claim 3, wherein when viewed along the first direction, each of the plurality of outlet ducts is inclined with or perpendicular to the horizontal plane in the extending direction of each of the plurality of outlet ducts.

5. The imaging device of claim 4, wherein when viewed along the first direction, an angle is defined between extending directions of two adjacent of the plurality of outlet duct, and the two angles are equal to each other.

6. The imaging device of claim 1, wherein each of the plurality of inlet ducts extends along the first direction.

7. The imaging device of claim 1, wherein an air inlet is provided at an end of the inlet duct away from the outlet duct, and an area of the air inlet is larger than an area of the air outlet.

8. The imaging device of claim 1, wherein each of the plurality of air duct further comprises a transiting duct, and the transiting duct connects to the inlet duct and the outlet duct.

9. The imaging device of claim 1, further comprising a supporting base, wherein the supporting base comprises an installing portion and a plurality of connecting rods, a cavity and a first opening are defined on the installing portion, the cavity and the first opening are communicated with each other, the lens is disposed within the cavity, the lens element is exposed from the first opening, one end of each of the plurality of connecting rods connects to the installing portion or connects to another one of the plurality of connecting rods, and another end of each of the plurality of connecting rods connects to the inlet duct.

10. A mobile device comprising an imaging device, the imaging device comprising:
   a lens comprising a lens element, the lens element having an optical axis extending along a first direction;
   a plurality of air ducts, each of the plurality of air ducts comprising an inlet duct and an outlet duct connecting to the inlet duct, the inlet duct configured to introduce air;
   wherein when viewed along the first direction, a plurality of the outlet duct are disposed around the lens element, each of the plurality of outlet ducts extends towards the optical axis in a direction perpendicular to the first direction; each of the plurality of outlet ducts comprises an air outlet away from the inlet duct, and the air outlet is configured to exhaust air from the inlet duct to form an air wall; along an extending direction of each of the plurality of outlet ducts, a projection of the air outlet onto the optical axis forms an axial segment, and the air wall from the air outlet passes through the axial segment, axial segments of the plurality of outlet ducts are spaced from each other.

11. The mobile device of claim 10, wherein along the first direction, a projection of each of the plurality of outlet ducts is spaced from a projection of the lens element.

12. The mobile device of claim 10, wherein when viewed along the first direction, a horizontal plane is defined, the horizontal plane is perpendicular to a direction of gravity and tangent to a lower side of the lens element in the direction of gravity, the plurality of outlet ducts is disposed on a side of the lens element where the horizontal plane is tangent to the lens element, and the first direction is perpendicular to the direction of gravity.

13. The mobile device of claim 12, wherein when viewed along the first direction, each of the plurality of outlet ducts is inclined with or perpendicular to the horizontal plane in the extending direction of each of the plurality of outlet ducts.

14. The mobile device of claim 13, wherein when viewed along the first direction, an angle is defined between extending directions of two adjacent of the plurality of outlet duct, and the two angles are equal to each other.

15. The mobile device of claim 10, wherein each of the plurality of inlet ducts extends along the first direction.

16. The mobile device of claim 10, wherein an air inlet is provided at an end of the inlet duct away from the outlet duct, and an area of the air inlet is larger than an area of the air outlet.

17. The mobile device of claim 10, wherein each of the plurality of air duct further comprises a transiting duct, and the transiting duct connects to the inlet duct and the outlet duct.

18. The mobile device of claim 10, wherein the imaging device further comprising a supporting base, the supporting base comprises an installing portion and a plurality of connecting rods, a cavity and a first opening are defined on the installing portion, the cavity and the first opening are communicated with each other, the lens is disposed within the cavity, the lens element is exposed from the first opening, one end of each of the plurality of connecting rods connects to the installing portion or connects to another one of the plurality of connecting rods, and another end of each of the plurality of connecting rods connects to the inlet duct.

* * * * *